(12) United States Patent
Sato (10) Patent No.: US 6,315,228 B1
(45) Date of Patent: *Nov. 13, 2001

(54) BAITCASTING REEL

(75) Inventor: Jun Sato, Sakai (JP)

(73) Assignee: Shimano Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/754,711

(22) Filed: Dec. 11, 1996

Related U.S. Application Data (63) Continuation of application No. 08/517,659, filed on Aug. 22, 1995, now abandoned, which is a continuation of application No. 08/193,588, filed on Feb. 8, 1994, now abandoned, which is a continuation of application No. 08/057,012, filed on May 5, 1993, now Pat. No. 5,292,087, which is a continuation of application No. 07/739,487, filed on Aug. 2, 1991, now abandoned.

(30) Foreign Application Priority Data

Jul. 8, 1990 (JP) .......................................... 2-83880
Nov. 1, 1991 (JP) ............................................ 3-473

(51) Int. Cl.$^7$ ..................... A01K 89/0155; A01K 89/02
(52) U.S. Cl. ................... 242/312; 242/261; 242/283; 242/288
(58) Field of Search ................................. 242/288, 310, 242/312, 268, 261, 283

(56) References Cited

U.S. PATENT DOCUMENTS

| 3,612,425 | 10/1971 | Shakespeare et al. . |
| 4,043,521 | 8/1977 | Hull et al. . |
| 4,512,536 | 4/1985 | Sato . |
| 4,674,699 | 6/1987 | Fukushima et al. . |
| 4,905,930 | 3/1990 | Puryear et al. . |
| 5,292,087 | 3/1994 | Sato . |

FOREIGN PATENT DOCUMENTS

| 345872 | 4/1931 | (GB) . |
| 353370 | 7/1931 | (GB) . |
| 740296 | 11/1955 | (GB) . |
| 2092872 | 8/1982 | (GB) . |
| 55-30144 | 7/1980 | (JP) . |
| 59-26972 | 2/1984 | (JP) . |
| 60-15167 | 2/1985 | (JP) . |

OTHER PUBLICATIONS

Daiwa Brochure, "The 1986 Daiwa Collection," describing Daiwa Procaster Tournament series spools, Daiwa Procaster Magforce series spools, Daiwa Millionaire series spools, Daiwa Sealine series spools, and Daiwa Sealine Sportline series spools (1986).
Ryobi Brochure, "Fishing Tackle for 1986," describing V–MAG–Graphite series spools (1986).
Penn Reels Brochure, "New International II Two–Speed Series," Model 80S, 80SW (1985).
Penn Reels Brochure, "New! Super Level Wind 320 GTi", Model 320 GTi (1986).
Ryobi Brochure, "Introducing the Finest Baitcasting Reel Series in the World–Ryobi 'V' Spool," Models AD 5000V, AD 5000, AD 5500 (1983).
ABU Garcia Brochure, "Garcia 1986 . . . Your Future Never Looked So Good," Models Polaris 1 and Polaris 2.

*Primary Examiner*—Katherine A. Matecki
(74) *Attorney, Agent, or Firm*—Jeffer, Mangels, Butler & Marmaro LLP (57) ABSTRACT

A baitcasting reel includes right and left cases constituting a reel body, and a level wind mechanism and a rotatable member disposed between walls of the right and left cases. The walls of the right and left cases and components interconnecting these walls are formed of a single material into an integral, one-piece unit. A lid is attached the integral, one-piece unit so that one of the cases has a space for accommodating a braking mechanism to act on a line takeup spool. The reel body has such an outer surface that outer wall surfaces of the integral, one-piece unit and lid are formed on the same plane.

28 Claims, 14 Drawing Sheets

BAITCASTING REEL

This application is a continuation of application Ser. No. 08/517,659, filed on Aug. 22, 1995, now abandoned, which is a continuation of application Ser. No. 08/193,588, filed on Feb. 8, 1994, now abandoned, which is a continuation of application Ser. No. 08/057,012, filed on May 5, 1993, now U.S. Pat. No. 5,292,087, which is a continuation of application Ser. No. 07/739,487, filed on Aug. 2, 1991, now abandoned.

BACKGROUND OF THE INVENTION

1. Field of the Invention

This invention relates to baitcasting reels, and more particularly to a baitcasting reel having a level wind mechanism and a spool arranged between walls of right and left cases forming a reel body.

2. Description of the Related Art

Conventionally, a relatively large reel designed for use in trolling and having no level wind mechanism has part of one of the cases, the other case, and a thumb rest interconnecting the two cases, all formed into an integral unit of a single material such as an aluminum alloy.

In the case of a relatively small reel having a level wind mechanism, such as a baitcasting reel with which casting and reeling are repeated frequently, it is desirable to employ a strong structure of a single material as noted above to withstand external forces.

If the cases of a reel body are formed entirely of a single material, then it may be necessary to provide an opening through at least one of the cases to facilitate insertion of a spool into the reel body. It may also be necessary to form a space within the case having the opening. The space may be used to receive various elements. The space may also be provided to reduce the total weight of the reel body. The space should be larger than the opening.

With the reel body having the above construction, however, the interior space takes a bag-like form between the cases though an increased strength is secured. When fitting the components in position, the components must be inserted into the space through the spool-receiving opening between the walls of the cases. This renders assembly of the reel time-consuming, and leaves room for improvement.

SUMMARY OF THE INVENTION

An object of the present invention is to provide an improved baitcasting reel having a reel body formed integral of a single material as noted above to secure excellent strength, and allowing components to be mounted in position relative to the cases with little time and trouble.

The above object is fulfilled, according to the present invention, by a baitcasting reel comprising right and left cases constituting a reel body, and a level wind mechanism and a spool disposed between walls of the right and left cases, wherein at least the walls of the right and left cases and components interconnecting the walls are formed of a single material into an integral, one-piece unit, the integral, one-piece unit having a lid attached thereto so that one of the cases has a space for accommodating a device associated with the spool, the reel body having such an outer surface that an outer wall surface of the integral unit and an outer wall surface of the lid are formed on the same plane.

Figure 1:
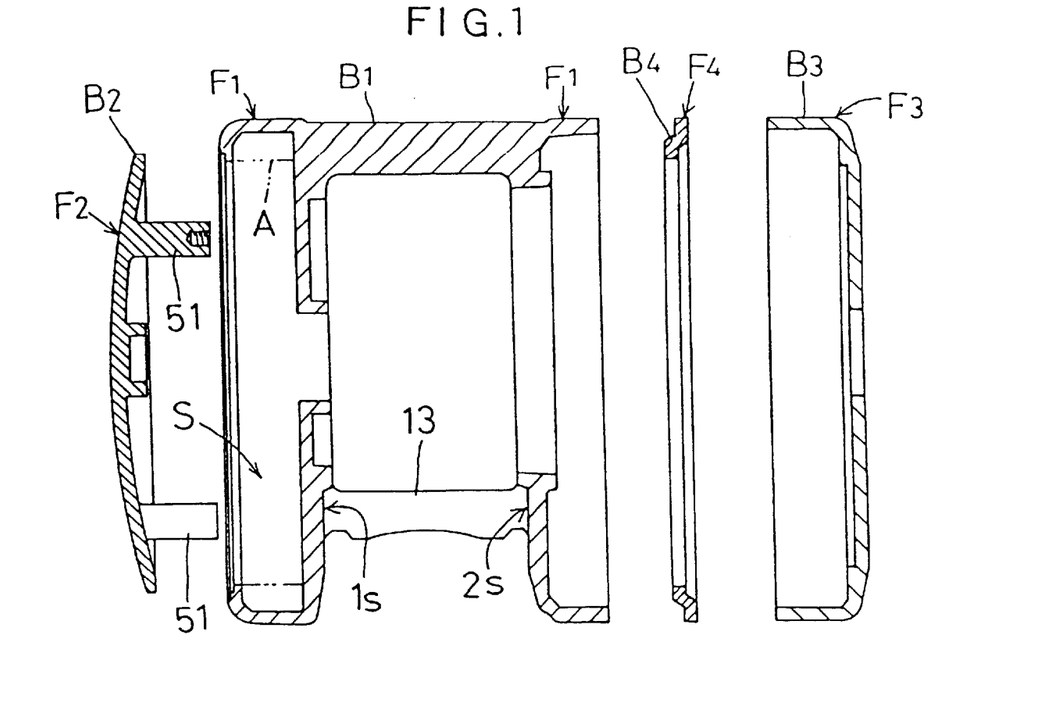
FIG. 1 is a sectional view of the reel body.
Figure 2:
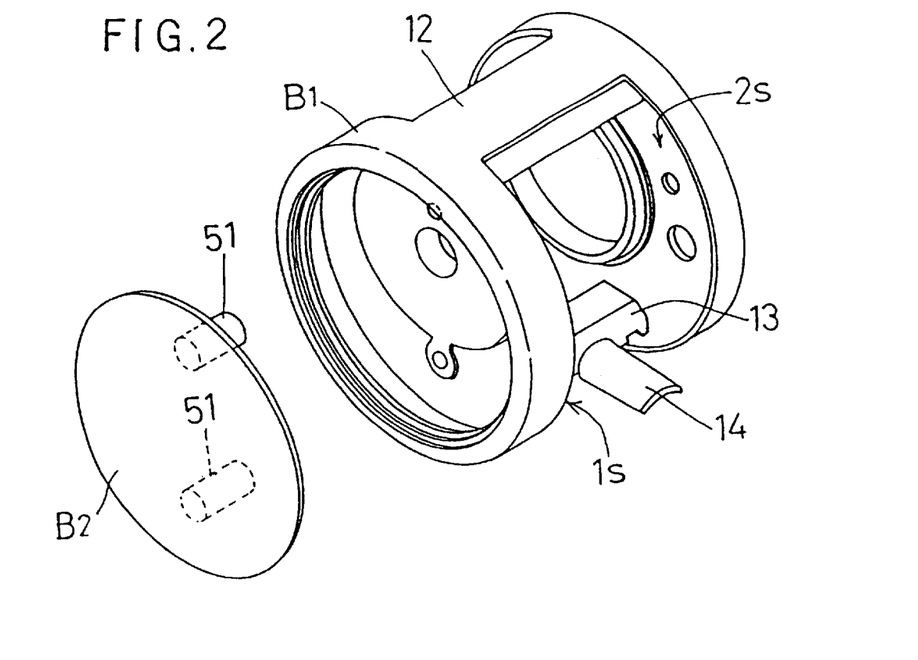
FIG. 2 is a perspective view of a portion of the reel body.

This baitcasting reel may be constructed as shown in FIGS. 1 and 2. Since the parts of the right and left cases opposed to each other are formed integral, an external force applied thereto does not readily result in a change in the relative position between the two cases. One of the cases is formed by attaching a lid B2 to the integral unit B1. When assembling the reel, components may be placed inside a space S defined by this case before attaching the lid B2, through an opening to be closed by the lid B2.

When the lid B2 is attached, an outer wall surface F2 of the lid forms a smooth continuation to an outer wall surface F1 of the integral unit B1. Consequently, the reel body gives a pleasant feel to the touch when the angler holds the reel in his or her hand in a way to cover the reel, for example.

The above integral, one-piece formation gives an increased strength in the reel body, allows the components to be mounted in position to the case with little time and trouble, and realizes an improved baitcasting reel pleasant to the touch.

Particularly since, according to the present invention, the case is formed to have an open interior space, the integral, one-piece unit may readily be manufactured by die casting or a cutting operation.

Other features and advantages of the present invention will be apparent from the following description of the preferred embodiments.

BRIEF DESCRIPTION OF THE DRAWINGS

The drawings show baitcasting reels according to the present invention, in which.

DETAILED DESCRIPTION OF THE PREFERRED EMBODIMENTS

Baitcasting reels according to the present invention will be described in detail with reference to the drawings.

FIGS. 1 through 8 show a baitcasting reel in one embodiment of the invention. The reel comprises a reel body having a left case 1 and a right case 2. The reel body has a level wind mechanism R mounted in a front position thereof and including a screw shaft 3, a guide rod 4 and a line guide 5. Further, the reel body has a rotatable spool 6 mounted centrally thereof and a clutch controller 7 mounted in a rear position. The right case 2 supports a handle 8, a drag controller 9, a cast controller 10 and a brake controller 11.

Figure 3:
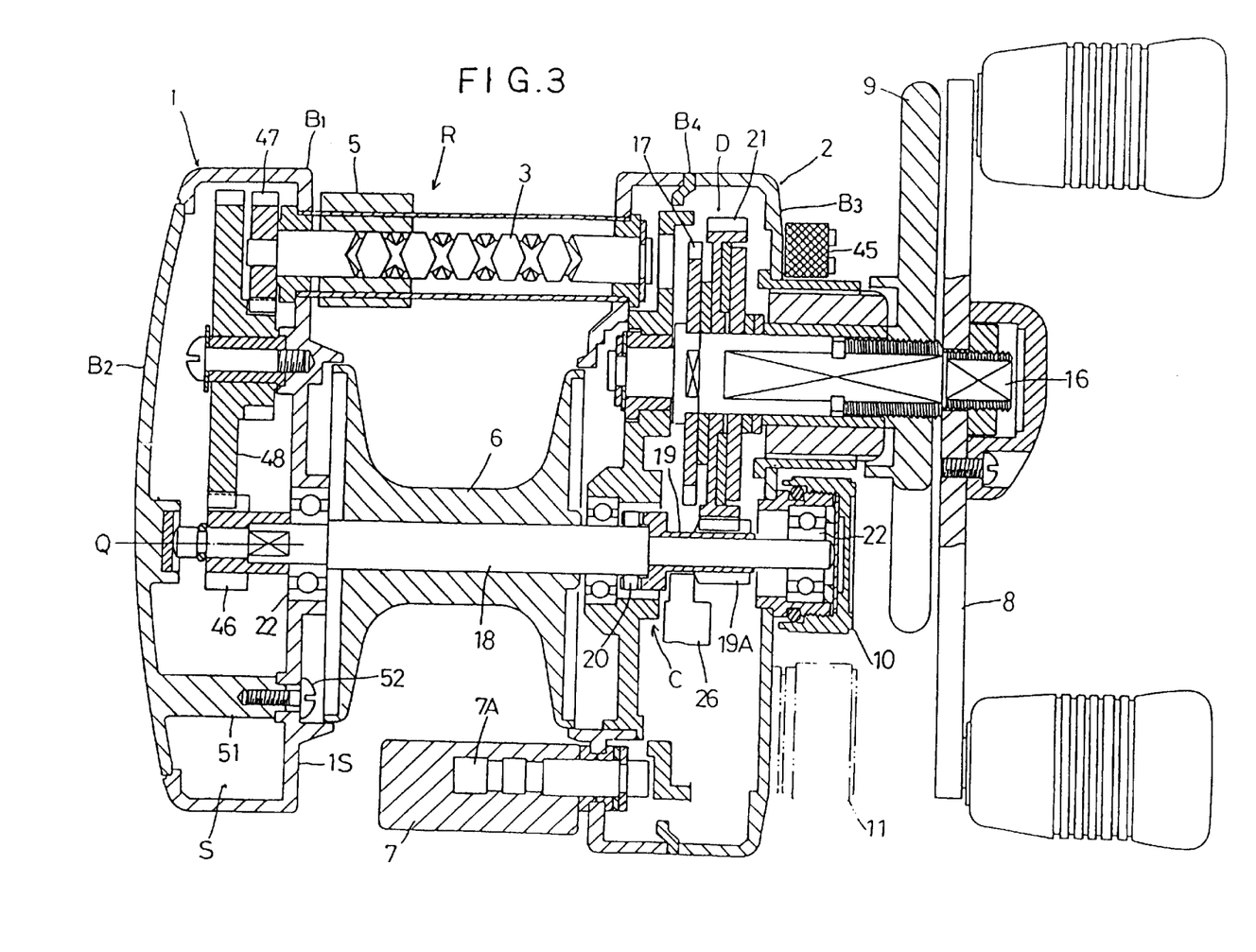
FIG. 3 is a plan view in cross section of a reel.

In this reel, a wall 1S of the left case 1, a wall 2S of the right case 2, and a thumb rest 12 and a pair of lower frames 13 interconnecting the two walls 1S and 2S are formed into an integral, one-piece unit by aluminum die casting. To form the reel body, a lid B2 acting as part of the left case 1 is attached to the integral unit B1, and a lid B3 acting as part of the right case 2 is attached thereto. The reel body has a circular configuration in side view (seen in a direction parallel to an axis Q of the spool 6). The axis Q of the spool 6 is offset a predetermined amount upward from the center P of the circular configuration. The screw shaft 3 is disposed on a horizontal plane L level with the center P.

A mounting foot 14 is disposed between the pair of lower frames 13 for attaching the reel to a rod. The foot 14 has a vertical distance H not exceeding 40 mm from the center P, with the reel body having an outside diameter T within a range of 45 to 70 mm. The reel having such dimensions facilitates palming at a casting time.

The integral, one-piece unit B1 shown in FIG. 1 is formed by die casting. A peripheral portion A of the unit B1 is removed to reduce weight.

As shown in FIGS. 1 through 3, the lid B2 includes a pair of legs 51. These legs 51 are securely fixed to the wall 1S by screws 52, thereby to close at interior space S of the case 1 with the lid B2. An annular element B4 is fitted between the integral, one-piece unit B1 and lid B3. The left lid B2 and integral, one-piece unit B1 are cut so that outer wall surfaces F2 and F1 are substantially flush with each other, forming a substantially continuous exterior surface. Further, a cylindrical outer surface F1 of the integral, one-piece unit B1, a peripheral surface F4 of the annular element B4 and a cylindrical outer surface F3 of the right lid B3 are cut to form a smooth, continuous surface together.

In this reel, one of the legs 51 is covered by the spool 6 to maintain the fishing line out of contact with the head of screw 52.

The lid B2, integral unit B1 and lid B3 are finished to have the same color tone by a treatment with a bright alumite. The annular element B4 is finished to have a different tone in order to moderate a slight variation in tone between the integral, one-piece unit B1 and lid B3.

The handle 8 and drag controller 9 are mounted on a handle shaft 16 extending from the right case 2. The handle shaft 16 supports a drag mechanism D and a ratchet wheel 17 mounted on an inward end portion thereof. A spool shaft 18 rotatable with the spool 6 supports a clutch sleeve 19 slidably mounted thereon and a pin 20 fixed to the spool shaft 18 to be engageable with the clutch sleeve 19. The clutch sleeve 19 and pin 20 constitute a clutch mechanism C. The clutch sleeve 19 has an input gear 19A meshed with an output gear 21 of the drag mechanism D, whereby torque from the handle 8 is transmitted to the spool 6 through the drag mechanism D and clutch mechanism C.

The spool shaft 18 is supported at opposite ends thereof by bearings 22. The cast controller 10 is screwed to the right case 2 for adjusting a frictional force applied to the righthand end of the spool shaft 18. The ratchet wheel 17 has teeth 17A engageable with a pawl 24 pivotable on an axis 23 to prevent backward turning of the handle 8.

Figure 4:
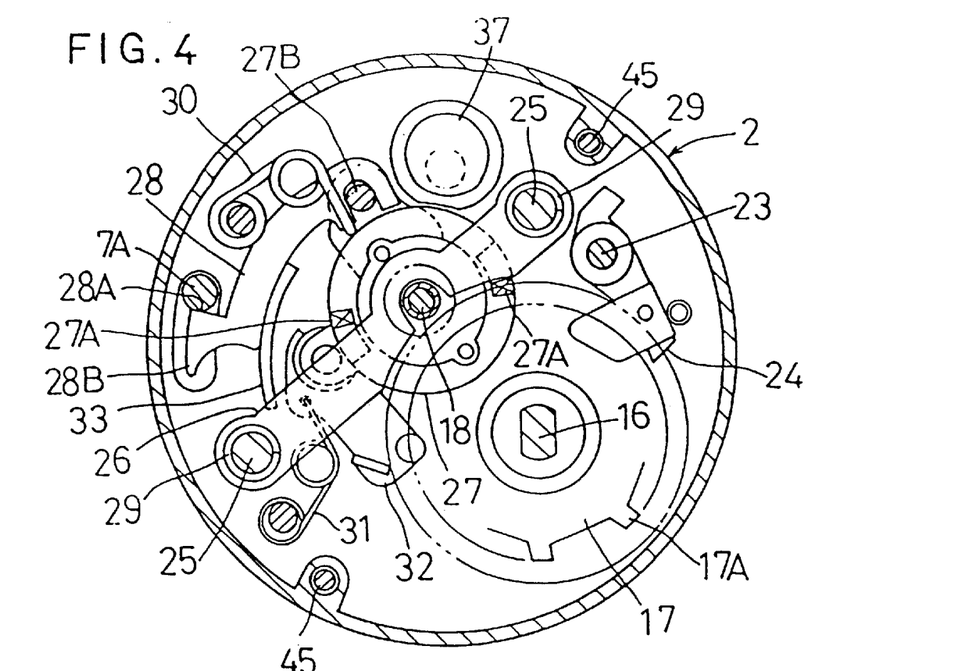
FIG. 4 is a side view of a clutch operating system.

As shown in FIG. 4, the clutch sleeve 19 is engaged with a shifter 26 slidably supported on a pair of support shafts 25. A rotary cam 27 is rotatably mounted coaxially with the axis Q of the spool 6. This rotary cam 27 defines a pair of cam surfaces 27A for sliding the shifter 26. The rotary cam 27 has an engaging pin 27B engaged with a link element 28 operable through contact with a control pin 7A of the clutch controller 7.

Compression springs 29 are mounted on the support shafts 25 to urge the shifter 26 and clutch mechanism C to a clutch engaging position. A toggle spring 30 acts on the rotary cam 27 to maintain the rotary cam 27 in a position to engage or a position to disengage the clutch mechanism C. A further toggle spring 31 acts on a return arm 32 to switch the arm 32 to a position in which an end thereof interferes with the ratchet wheel 17 when the clutch mechanism C is set to the disengaged position. When disengaging the clutch mechanism C, the clutch controller 7 is depressed to place the link element 28 into contact with a guide 33. Then the link element 28 moves describing an arcuate locus while in contact with the guide 33, to rotate the rotary cam 27. As a result, the clutch mechanism C is disengaged through pressure contact with the cam surfaces 27A. When engaging the clutch mechanism C, the handle 8 is turned in a direction to take up the fishing line. This causes a tooth 17A of the ratchet wheel 17 to push the return arm 32, whereby the rotary cam 27 is returned. Consequently, the shifter 26 moves under the urging force of compression springs 29 to the position to engage the clutch mechanism C.

Figure 5:
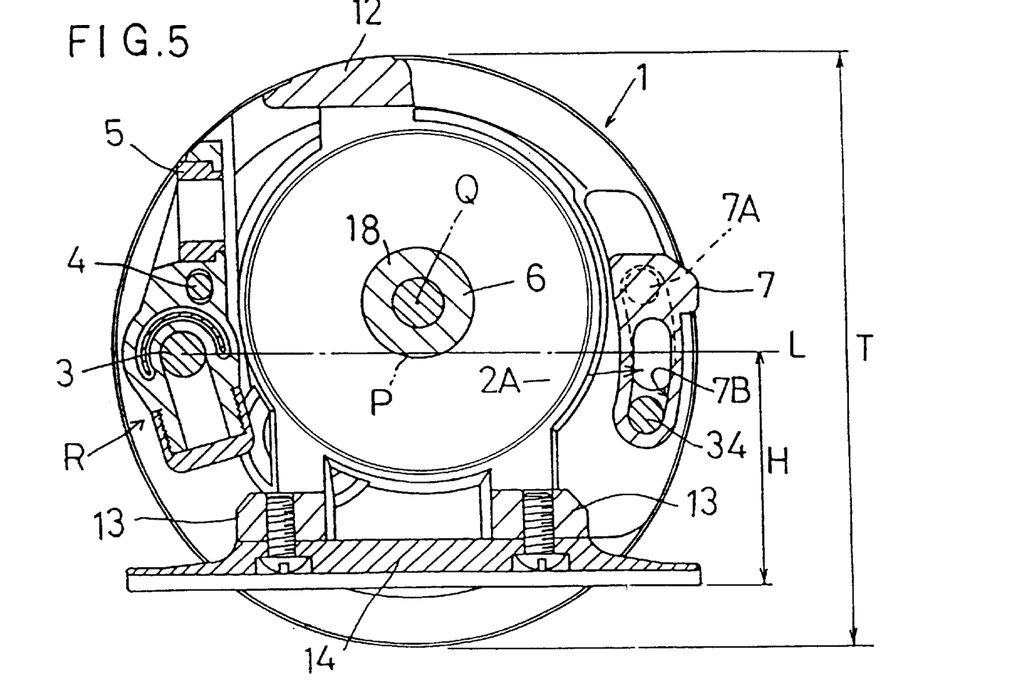
FIG. 5 is a side view in vertical section of the reel.

As shown in FIG. 5, the clutch controller 7 is supported to be slidably only relative to the wall 2S of the right case 2. The control pin 7A extends through an arcuate guide bore 2A so that the clutch controller 7 describes an arcuate locus about the center P of the reel body in side view. The clutch controller 7 defines an arcuate perforation 7B to receive a connecting frame 34.

It is necessary, when assembling the reel, to insert the control pin 7A into the guide bore 2A in such a way that the pin 7A is correctly placed above an engaging portion 28A of the link element 28. To facilitate this operation, the link element 28 includes a restricting projection 28B formed at a lower end thereof to stop insertion of the pin 7A to a position below the link element 28.

Figure 6:
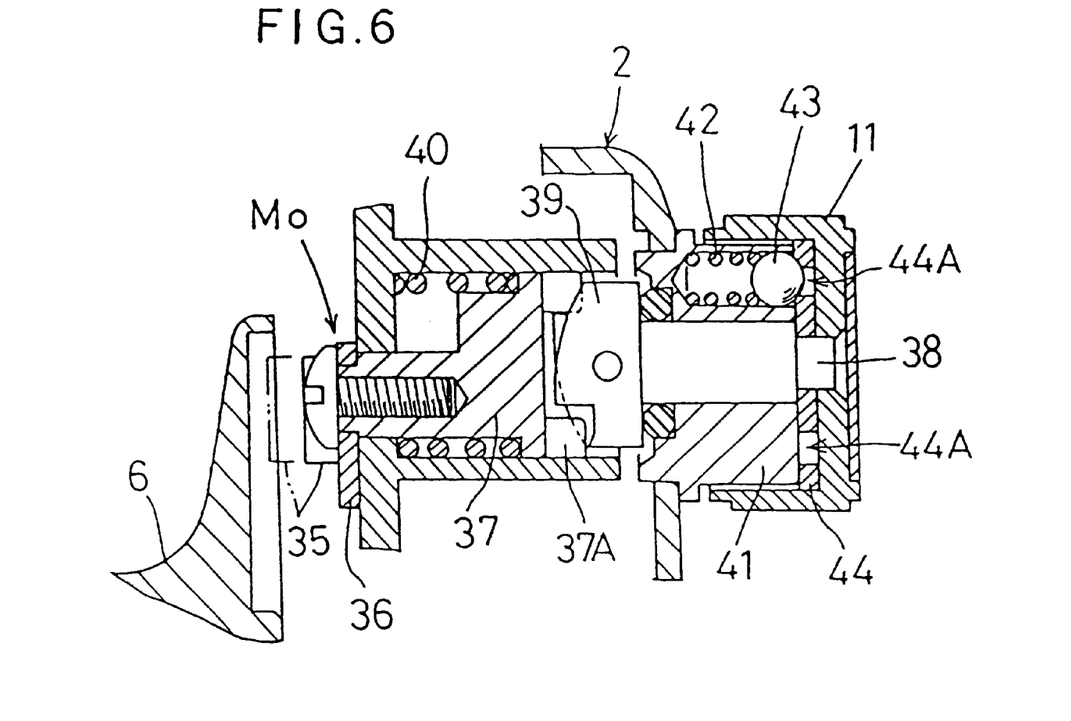
FIG. 6 is a sectional view of a brake control system.
Figure 7:
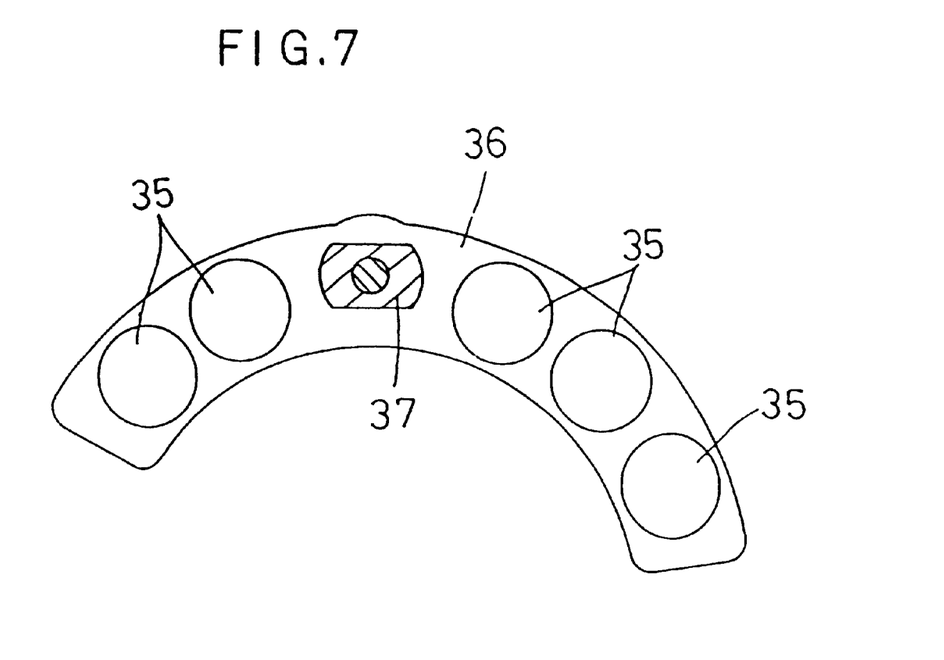
FIG. 7 is a side view of a brake plate.
Figure 8:
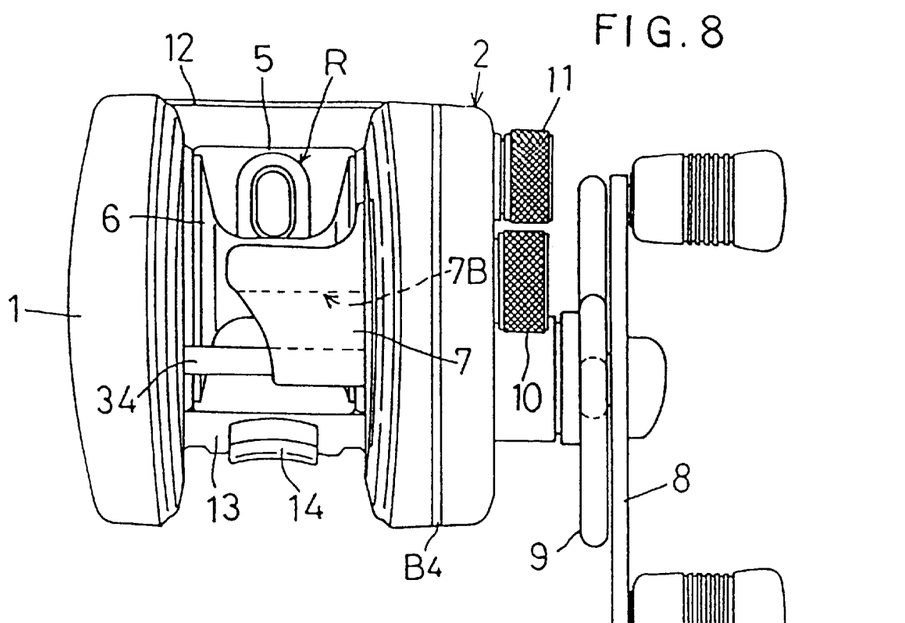
FIG. 8 is a rear view of the reel.

As shown in FIGS. 6 and 7, the right case 2 has a magnet type brake mechanism MO mounted therein, whose braking force is adjustable by the brake controller 11. The brake mechanism M' includes a plate 36 disposed adjacent a side face of the spool 6 and having a plurality of magnets 35, a slide element 37 for supporting the plate 36 to be movable toward and away from the spool 6, a cam 39 connected to the brake controller 11 through a control shaft 38 for contacting a contact portion 37A of the slide element 37 to determine a position of the slide element 37, and a compression spring 40 for urging the slide element 37 away from the spool 6. A ball type detent mechanism is provided between the brake controller 11 and a support 41 secured to the reel body. This detent mechanism includes a compression spring 42, a ball 43 urged by the spring 42, and a plurality of bores 44A formed in a disk 44 rotatable with the brake controller 11. The ball 43 is selectively engageable with the bores 44A to maintain the brake controller 11 in a control position.

With this brake mechanism, the closer the magnets 35 are to the side face of the spool 6, the greater eddy currents are generated at a casting time in the spool 6 formed of an aluminum alloy to produce the greater braking force.

The right case 2 may be opened by removing screws 45 and lid B3.

As shown in FIG. 3, an output gear 46 is mounted on a left end of the spool shaft 18 while an input gear 47 is mounted on a left end of the screw shaft 3. The left case 1 houses an intermediate gear 48 meshed with the output gear 46 and input gear 47. Thus, the level wind mechanism R is driven with rotation of the spool 6.

Figure 9:
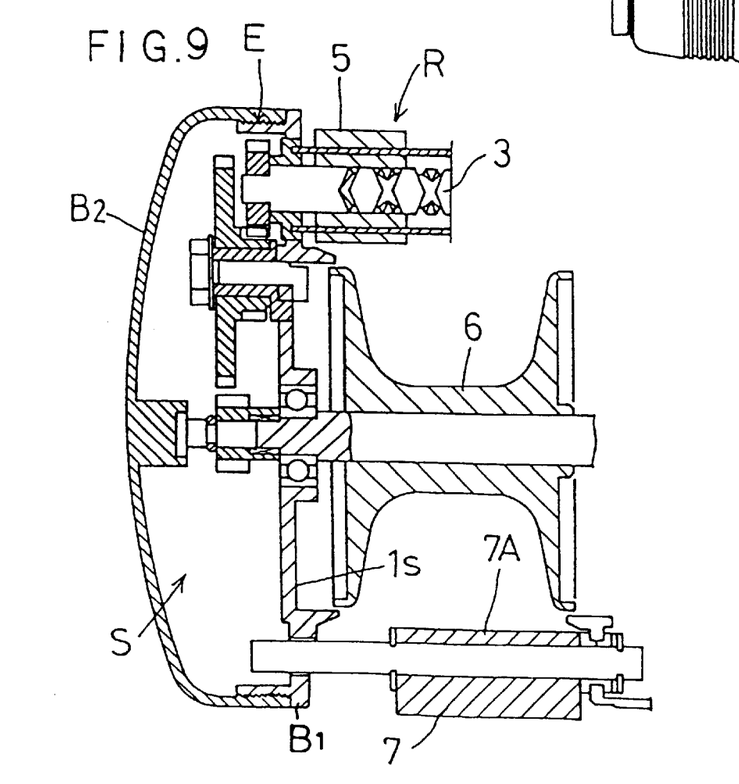
FIG. 9 is a sectional view of a reel body in another embodiment of the invention.

The above embodiment may be modified in various ways. For example, the lid B2 may be shaped as shown in FIG. 9, and attached to the integral, one-piece unit B1 through a screw portion E.

Figure 10:
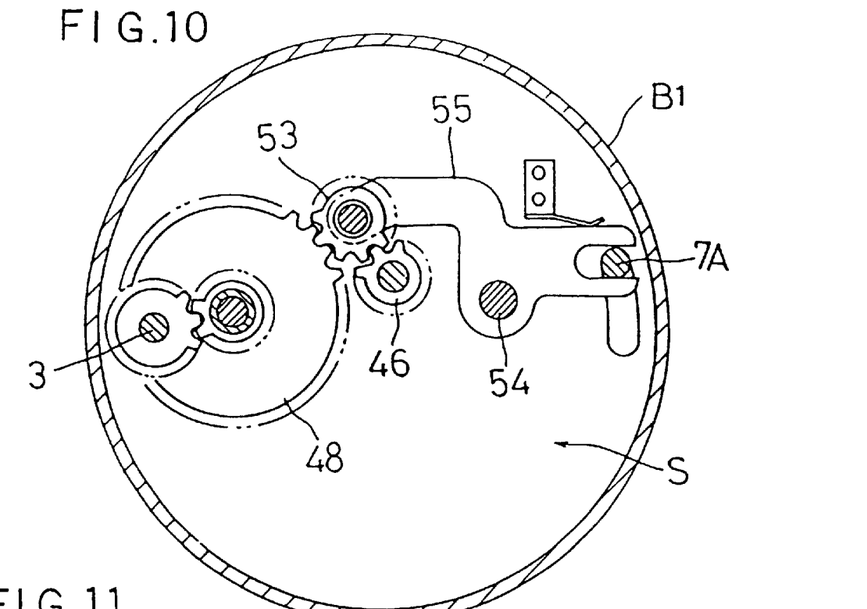
FIGS. 10 and 11 are a side view and a sectional view of components arranged in a space in a further embodiment of the invention.
Figure 11:
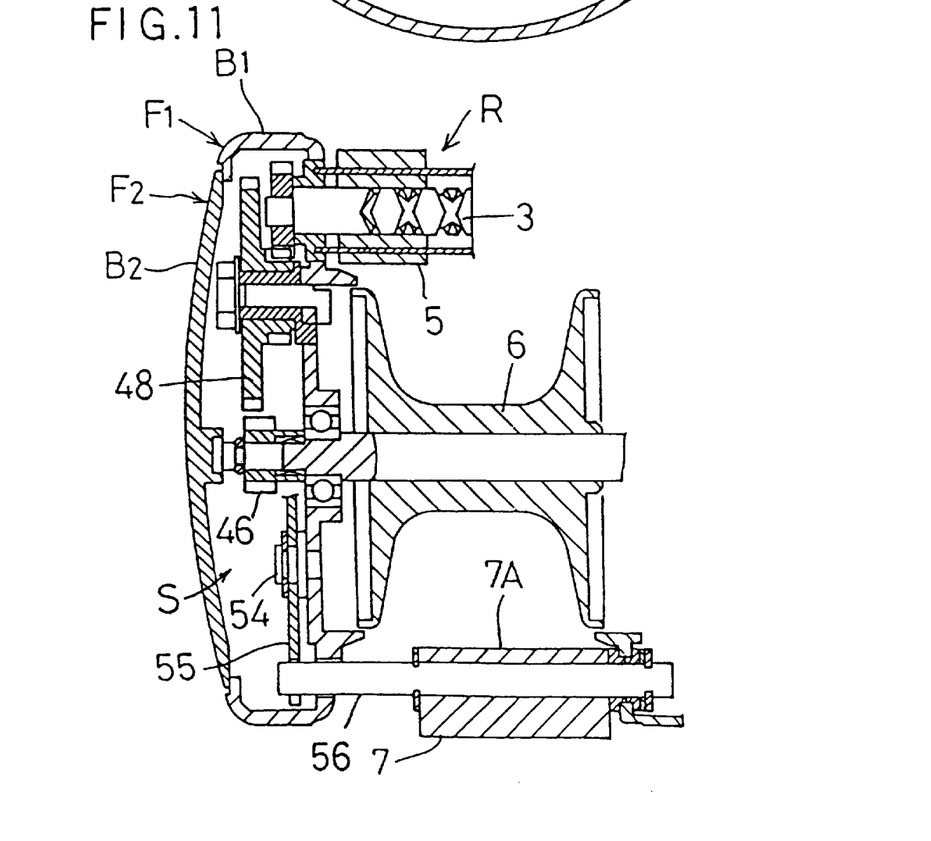

As shown in FIGS. 10 and 11, the left case 1 may contain in its interior space S a device operable with a declutching operation of the clutch controller 7 to break the interlock between the spool 6 and level wind mechanism R. This construction includes an idle gear 53 disposed between the output gear 46 of the spool shaft 18 and the intermediate gear 48 connected to the level wind mechanism R. The idle gear 53 is supported by an arm 55 pivotable on an axis 54. The arm 55 is interlocked with a control shaft 56 of the clutch controller 7.

Figure 12:
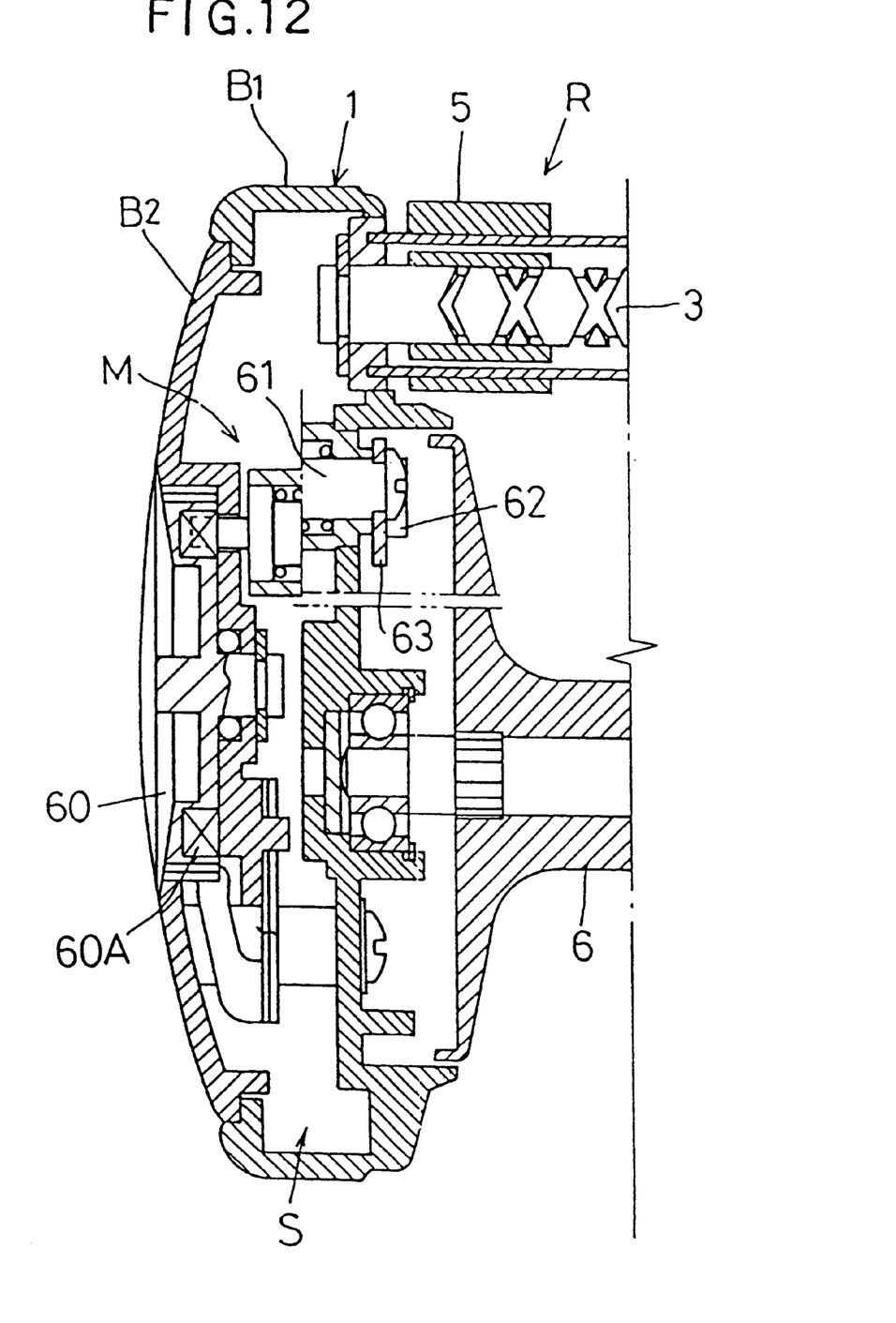
FIG. 12 is a sectional view of a construction including a magnet type brake mechanism.

FIG. 12 shows another modification which includes a magnet type brake mechanism M mounted in the left case 1 to act on the spool 6. The brake mechanism M includes a turn knob 60 defining a cam 60A, a rod 61 extendible and retractable through contact with the cam 60A, and a plate 63 attached to the rod 61 and having a plurality of magnets 62.

Figure 13:
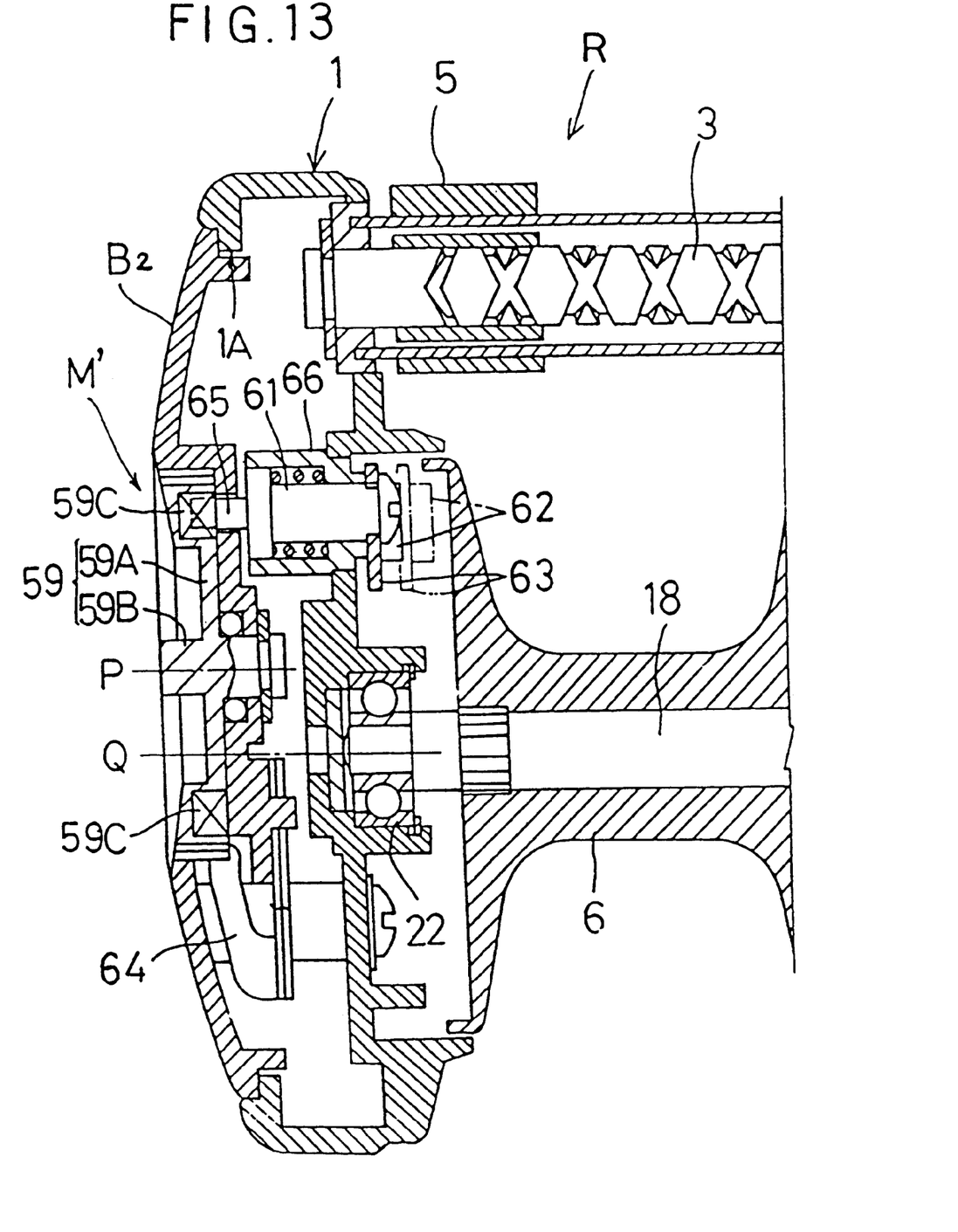
FIG. 13 a sectional view of a left part of a reel in a still further embodiment of the invention.
Figure 14:
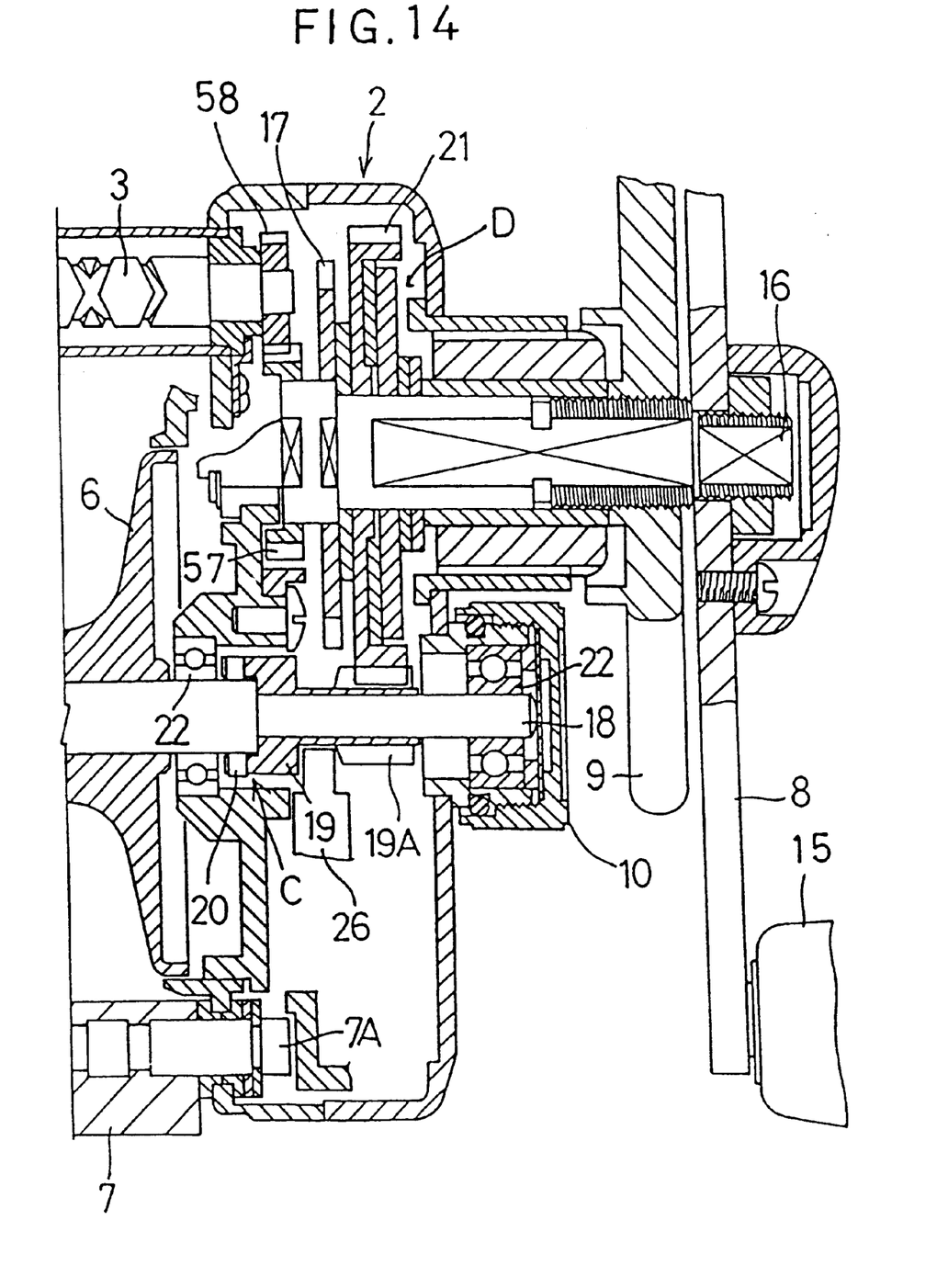
FIG. 14 is a sectional view of a right part of the reel shown in FIG. 13.
Figure 15:
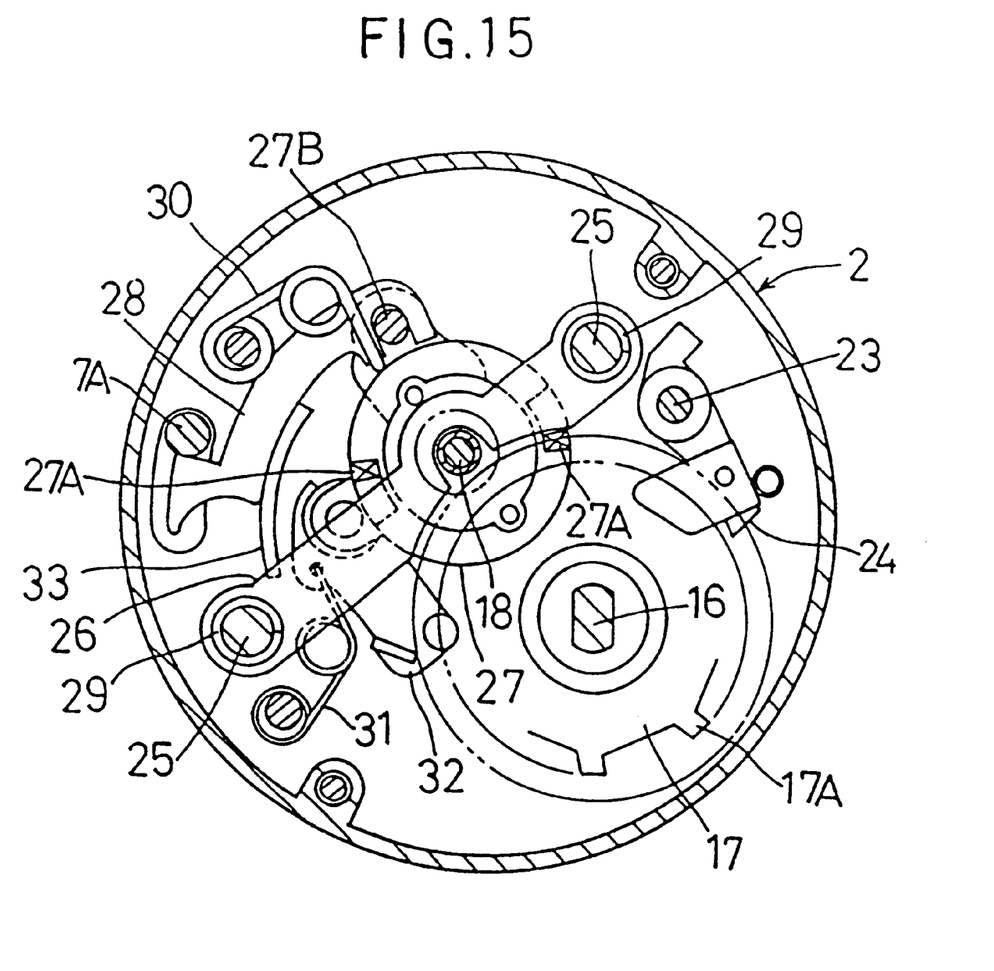
FIG. 15 is a side view of a clutch operating system in the reel shown in FIG. 13.
Figure 16:
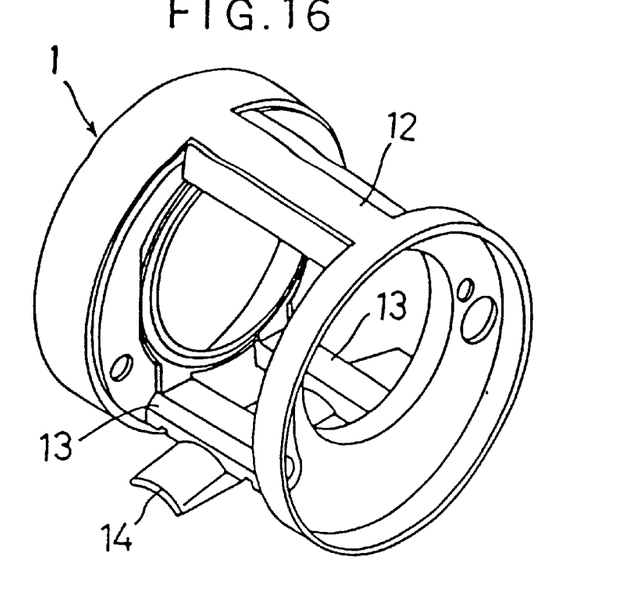
FIG. 16 is a perspective view of a reel body portion shown in FIG. 13.
Figure 18:
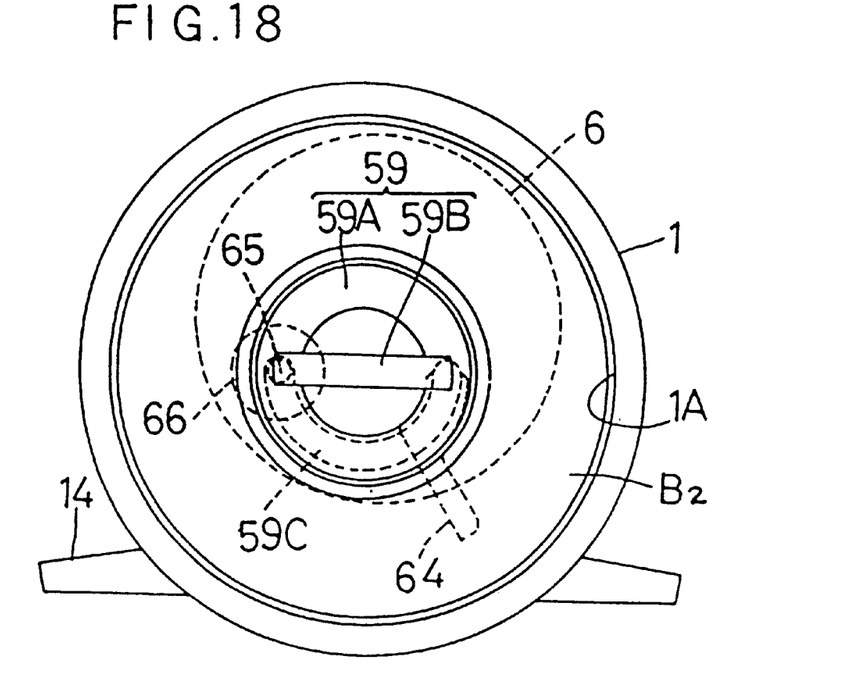
FIG. 18 is a side view of the reel shown in FIG. 13.

FIGS. 13 through 21 show a further embodiment of the present invention. Referring to FIG. 13, a baitcasting reel includes a brake mechanism M' mounted in the left case 1. As shown in FIG. 14, the handle shaft 16 carries an output gear 57 meshed with an input gear 58 mounted on the screw shaft 3. Thus, the level wind mechanism R is interlocked with a handle operation. As shown in FIGS. 13 and 18, the left case 1 defines, in an outer side thereof, a circular opening 1A having a center coinciding with the center P of the reel body. The brake mechanism M' is mounted on a disk-shaped lid B2 for closing the opening 1A.

The brake mechanism M' includes a plurality of magnets 62 arranged adjacent the metal spool 6, a device for moving these magnets 62 along the axis Q of the spool 6, and a turn adjuster 59 attached to the lid B2. The adjuster 59 includes a knob 50B formed on a surface of a disk-shaped member 59A. The adjuster 59 is rotatable around the center P of the reel body (which corresponds to the center of the lid B2). The device for moving the magnets 62 includes a plate 63 supporting the magnets 62, a pin 65 engaged in a cam groove 59C formed in an inside surface of the disk-shaped member 59A, and a rod 61 mounted in a cylinder 66 for transmitting movement of the pin 65 to the plate 63.

This brake mechanism M' further includes a leaf spring 64 engageable with teeth formed peripherally of the disk-shaped member 59A. Thus, the leaf spring 64 produces a clicking sound when the adjuster 59 is turned.

Figure 17:
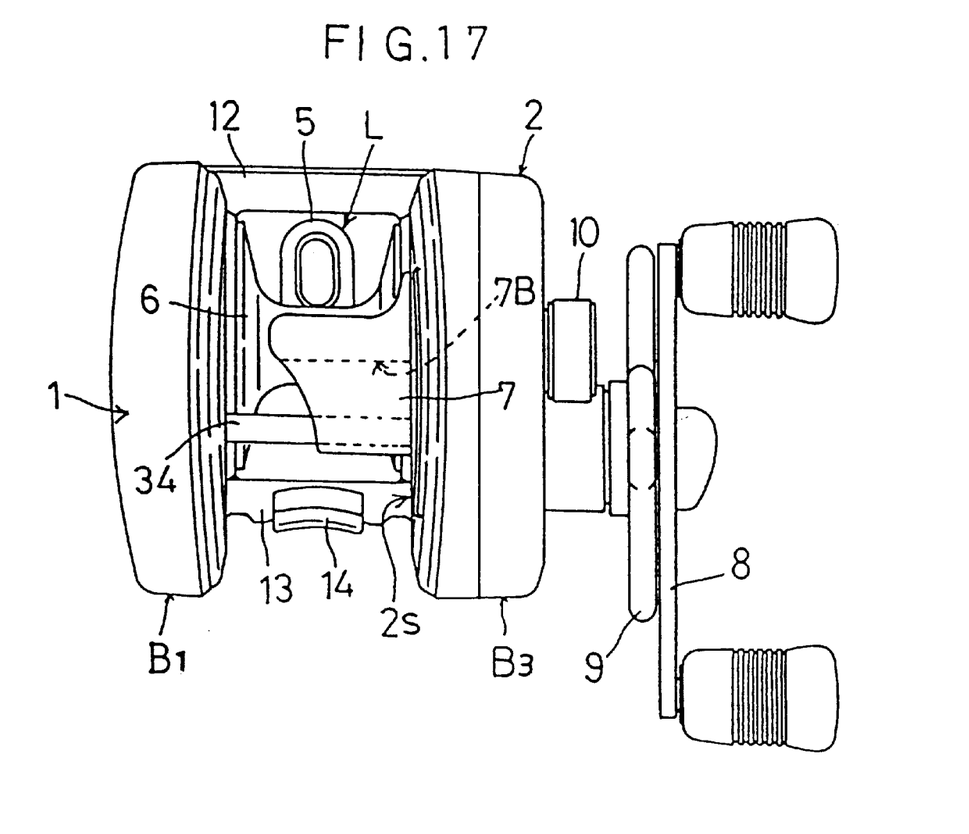
FIG. 17 is a rear view of the reel shown in FIG. 13.
Figure 19:
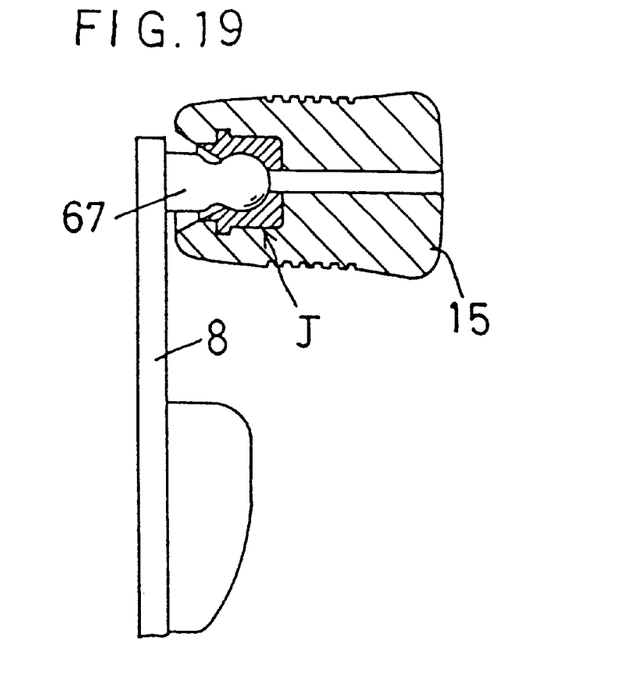
FIG. 19 is a sectional view of a grip of the reel shown in FIG. 13.
Figure 20:
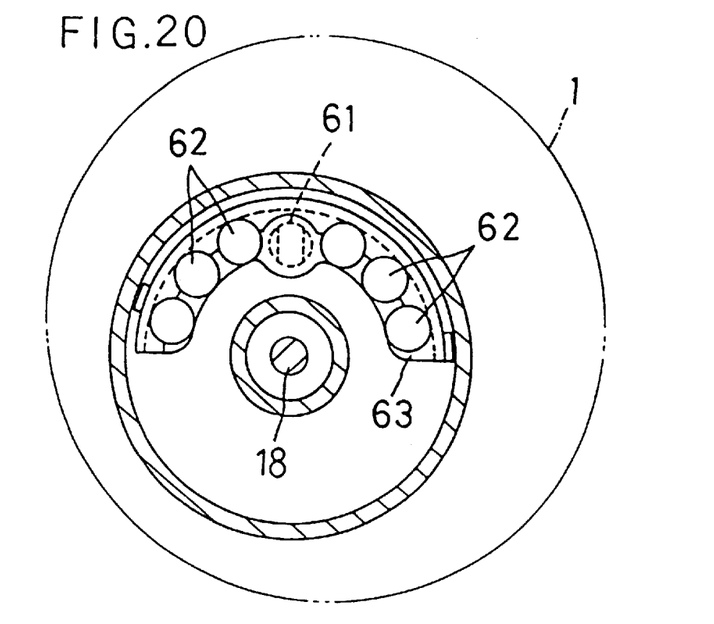
FIG. 20 is a sectional view showing an arrangement of magnets in the reel shown in FIG. 13.
Figure 21:
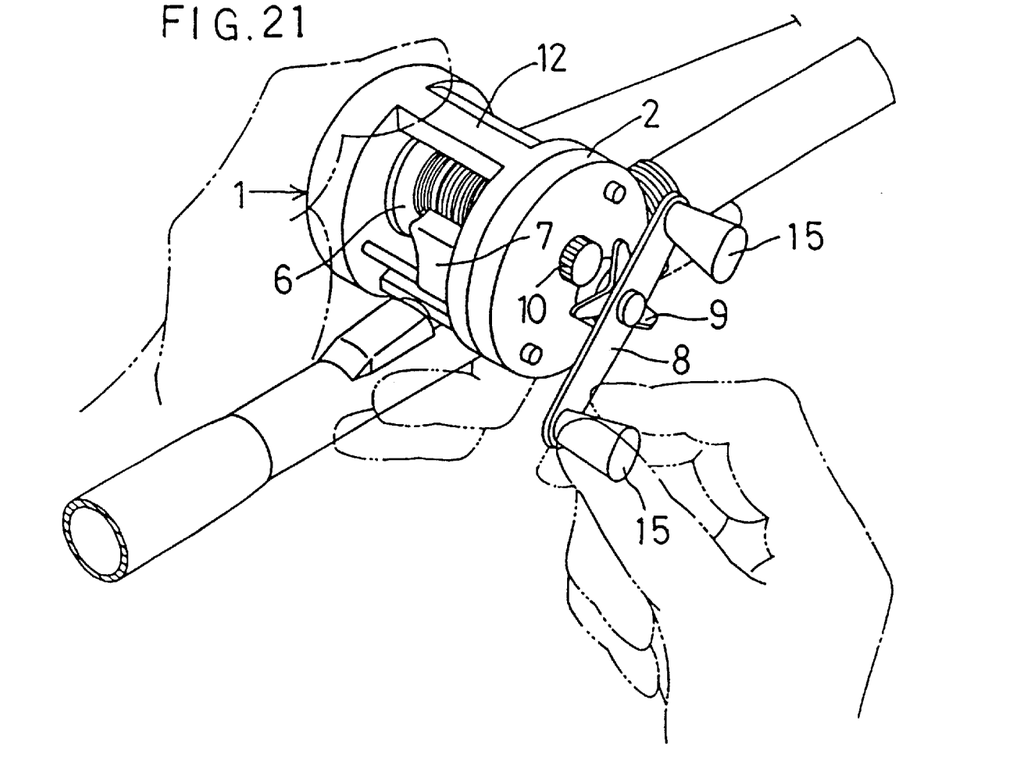
FIG. 21 is a perspective view showing a reeling state of the reel shown in FIG. 13.
Figure 22:
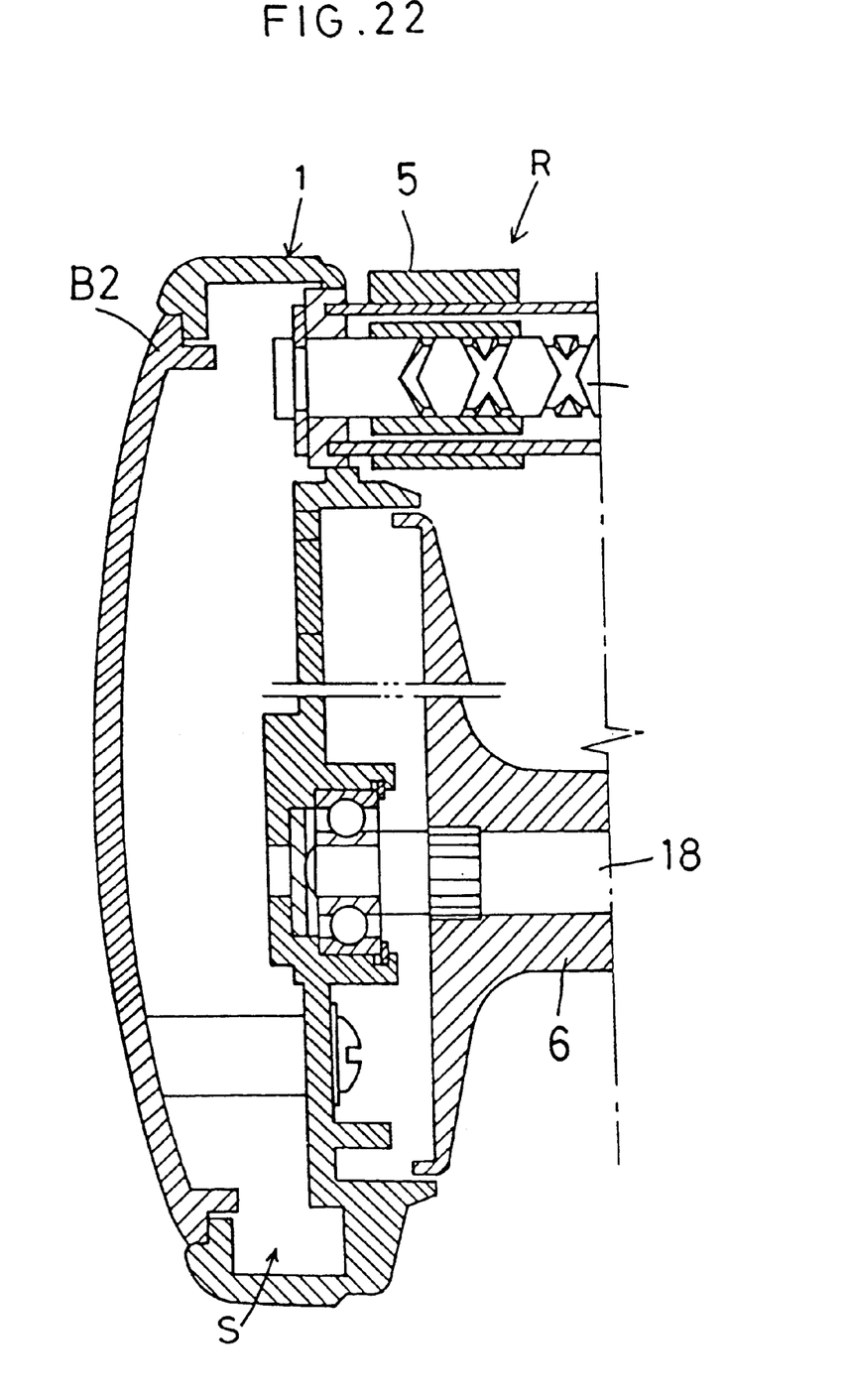
FIG. 22 is a fragmentary section of a reel in a still further embodiment of the invention.

As shown in FIGS. 17 and 19, the handle 8 carries a pair of grips 15 disposed at different distances to the handle shaft 16. The grip 15 closer to the handle shaft 16 has a universal joint J so that an axis of rotation thereof is oscillatable relative to a support axis 67. This construction allows the angler to take up the fishing line quickly only by turning his or her wrist.

Further, the reel according to the present invention may comprises a hollow left case 1 which does not include any brake mechanism as shown in FIG. 7. This is preferable in that the whole reel can be made lightweight.

The foregoing embodiments may be modified such that a conductor such as a copper plate is attached to the spool. The construction for operating the magnets and the arrangement of the magnets are also variable.

Like references are used to identify like components throughout the foregoing embodiments and modifications.

Further, it is in accordance with the present invention to manufacture the integral, one-piece unit by a cutting operation or to manufacture the lids by press working. The lids and integral, one-piece unit may define fitting joints to be locked to one another against rotation.

What is claimed is:

1. A baitcasting reel comprising:
    a reel body including a first case and a second case provided at a right and left side thereof, said first case including a wall, said second case including a wall, said reel body further including components interconnecting said walls of said cases;
    a spool rotatably supported to said reel body for winding a fishing line;
    a handle and a handle shaft provided at said second case to rotate said spool;
    a transmission unit including a clutch mechanism, for transmitting torque from said handle shaft to said spool;
    a level wind mechanism disposed between said walls of said cases; and
    wherein at least said walls of said cases and said components interconnecting said walls are formed of a single material into an integral, one-piece unit, said integral, one-piece unit having an outer wall surface, and wherein said reel body further includes a lid attachable to said first case, said lid having an outer wall surface, and said lid being attached to said integral, one-piece unit by lid-attaching means disposed on said wall of said first case, said lid-attaching means extending from a surface facing said spool and extending through said wall of said first case.

2. A baitcasting reel as claimed in claim 1, wherein the other case contains a magnet type brake mechanism having a braking force adjustable by a brake controller.

3. A baitcasting reel as claimed in claim 2, wherein said magnet type brake mechanism includes a plate disposed adjacent a slide face of said rotatable member and having a plurality of magnets, a slide element for supporting said plate to be movable toward and away from said rotatable member, a cam connected to said brake controller through a control shaft for contacting a contact portion of said slide element to determine a position of said slide element, and a compression spring for urging said slide element away from said rotatable member.

4. A baitcasting reel as claimed in claim 1, wherein said lid is attached to said integral, one-piece unit through a screw portion of said lid.

5. A baitcasting reel as claimed in claim 1, wherein said left case contains in an interior space thereof a device operable with a declutching operation of a clutch controller to break an interlock between said rotatable member and said level wind mechanism.

6. A baitcasting reel as claimed in claim 1, wherein said cases contain a magnet type brake mechanism.

7. A baitcasting reel as claimed in claim 6, wherein said brake mechanism includes a turn knob defining a cam, a rod extendible and retractable through contact with said cam, and a plate attached to said rod and having a plurality of magnets.

8. A baitcasting reel as claimed in claim 6, wherein said brake mechanism includes a conductor formed on a side face of said rotatable member, magnets arranged adjacent said conductor, and a rotatable adjuster for adjusting a distance of said magnets to said conductor.

9. A baitcasting reel as claimed in claim 8, wherein said reel body has a substantially circular configuration when seen in a direction along an axis of said rotatable member, said adjuster being rotatable on an axis located substantially centrally of said circular configuration, said axis of said rotatable member being offset from a center of said circular configuration.

10. A baitcasting reel as claimed in claim 1, wherein said lid includes a pair of legs each of which is fixed to said wall by said lid attaching means.

11. A baitcasting reel as claimed in claim 10, wherein at least one of said lid-attaching means is covered by said spool.

12. A baitcasting reel as claimed in claim 1, wherein said first case contains in an interior space thereof a level wind clutch disposed between said level wind mechanism and said spool; and a clutch controller connected to said level wind clutch, wherein said level wind clutch interrupts transmission of rotational movement of said spool to said level wind mechanism when said clutch controller is operated.

13. A baitcasting reel as claimed in claim 1, wherein at least one of said cases contains a magnet for braking said spool.

14. A baitcasting reel as claimed in claim 1, wherein said interconnecting components include a lower frame, said reel body has a substantially circular configuration when seen in a direction along an axis of said spool being set at a position offset from a substantial center of said circular configuration on a side opposite to said lower frame.

15. A baitcasting reel as claimed in claim 14, wherein said lid includes a pair of legs fixable to said walls.

16. A baitcasting reel as claimed in claim 15, wherein at least one of said legs is covered by said rotatable member.

17. A baitcasting reel as claimed in claim 14, wherein said lower frame includes a mounting foot having a lowermost portion, said reel body having an outside diameter ranging between 45 to 70 mm, said substantially circular configuration having a center (P), and wherein a distance (H) between said lowermost portion of said mounting foot and said center of said substantially circular configuration (P) is no grater than 40 mm.

18. A baitcasting reel as claimed in claim 1, wherein said interconnecting components include a thumbrest.

19. A baitcasting reel as claimed in claim 1, wherein said level wind mechanism has a screw shaft, and said reel body includes a torque transmitting means for transmitting torque from said handle shaft to said screw shaft of said level wind mechanism.

20. A baitcasting reel as claimed in claim 1, wherein the other case contains a magnet type brake mechanism having a braking force adjustable by a brake controller.

21. A baitcasting reel as claimed in claim 1, wherein said lid-attaching means is a screw.

22. A baitcasting reel as claimed in claim 1, wherein said outer wall surface of said integral, one-piece unit and said outer wall surface of said lid are substantially flush with each other and define a substantially continuous exterior surface.

23. A baitcasting reel comprising:
a reel body including right and left cases, said right case including a wall, said left case including a wall, said reel body further including components interconnecting said walls of said cases, said reel body further including a lid to cover a side of said left case;

a spool rotatably supported to said reel body and having a rotational axis for winding a fishing line;

a transmission unit including a handle, a handle shaft, an output gear, a drag mechanism, and a clutch mechanism for transmitting torque from said handle shaft to said spool, said handle being disposed beside said right case;

a level wind mechanism disposed between said walls of said cases; and means for transmitting torque from said handle shaft to said screw shaft of said level wind mechanism; and wherein at least said walls of said cases and said components interconnecting said walls are formed of a single material into an integral one-piece unit, said lid being fixed to said integral one-piece unit by a screw inserted from a right side of said left case, and a position of said screw on said left case is determined so that said screw is overlapped by said spool when seen in a direction along an axis of said spool.

24. A baitcasting reel comprising:
a reel body including right and left cases, said right case including a wall, said left case including a wall, said reel body further including components interconnecting said walls of said cases, said reel body further including a lid to cover a side of said right case;

a spool rotatably supported to said reel and having a rotational axis for winding a fishing line;

a transmission unit including a handle, a handle shaft, an output gear, a drag mechanism, and a clutch mechanism for transmitting torque from said handle shaft to said spool, said handle being disposed beside said left case;

a level wind mechanism disposed between said walls of said cases; and means for transmitting torque from said handle shaft to said screw shaft of level wind mechanism; and wherein at least said walls of said cases and said components interconnecting said walls are formed of a single material into an integral one-piece unit, said lid being fixed to said integral one-piece unit by a screw inserted from a left side of said right case, and a position of said screw on said right case is determined so that said screw is overlapped by said spool when seen in a direction along an axis of said spool.

25. A baitcasting reel comprising:
a second case including a second wall portion;

a first case opposed to said second case, said first case including a first wall portion and a lid member detachable from said first wall portion by a screw;

a handle for winding a fishing line, said handle being disposed beside said second case;

a spool and a level wind mechanism both disposed between said first wall portion and said second wall portion;

components for interconnecting said walls;

wherein said first wall portion, said second wall portion and said interconnecting components are formed of a single material into an integral one-piece unit, and a cylindrical portion between an outer wall surface of said first wall portion and an outer wall surface of said second wall portion is formed to have a smooth surface; and wherein said screw is covered by a side of said spool when said lid is attached to said first wall portion by said screw.

26. A baitcasting reel comprising:

a reel body including right and left cases, said right case including a wall, said left case including a wall, said reel body further including components interconnecting said walls of said cases, said reel body further including a lid, said lid having an outer wall surface;

a rotatable member for winding a fishing line;

a transmission unit including a handle, a handle shaft, an output gear, a drag mechanism, and a clutch mechanism for transmitting torque from said handle to said rotatable member;

a level wind mechanism disposed between said walls of said cases, said level wind mechanism having a screw shaft; and means for transmitting torque from said handle shaft to said screw shaft of said level wind mechanism; and wherein at least said walls of said cases and said components interconnecting said walls are formed of a single material into an integral one-piece unit, said integral one-piece unit having an outer wall surface, said led being attached to said integral one-piece unit so that one of said cases has a space for accommodating at least a portion of said torque transmitting means; wherein said outer wall surface of said integral one-piece unit and said outer wall surface of said lid are substantially flush with each other and define a substantially continuous exterior surface; and wherein said lid is an element of said right case, and wherein said left case includes a left lid, said left lid having an outer wall surface, and wherein said transmission unit and said torque transmitting means are accommodated inside said right case, said left lid being affixed to said integral one-piece unit, and wherein said outer wall surface of said integral one-piece unit and said outer wall surface of said left lid are substantially flush with each other and define a substantially exterior surface.

27. A baitcasting reel as claimed in claim 26, wherein said components interconnecting said walls of said cases include a thumb rest and a lower frame.

28. A baitcasting reel as claimed in claim 26, wherein one of said cases is hollow.

* * * * *